(12) United States Patent
Kunz et al.

(10) Patent No.: US 8,308,206 B2
(45) Date of Patent: Nov. 13, 2012

(54) CRASH ELEMENT

(75) Inventors: Andrea Kunz, Weißenburg (DE); Erwin Wachter, Ellingen-Stopfenheim (DE); Klaus Pfister, Maulbronn (DE)

(73) Assignees: Plastal GmbH, Weissenburg (DE); Dr. Ing. H.C. F. Porsche Aktiengesellschaft, Stuttgart (DE)

( * ) Notice: Subject to any disclaimer, the term of this patent is extended or adjusted under 35 U.S.C. 154(b) by 51 days.

(21) Appl. No.: 12/663,006

(22) PCT Filed: Jun. 4, 2008

(86) PCT No.: PCT/EP2008/056916
§ 371 (c)(1),
(2), (4) Date: Dec. 4, 2009

(87) PCT Pub. No.: WO2008/148802
PCT Pub. Date: Dec. 11, 2008

(65) Prior Publication Data
US 2010/0171330 A1  Jul. 8, 2010

(30) Foreign Application Priority Data
Jun. 5, 2007  (DE) .................. 10 2007 026 490

(51) Int. Cl.
*B60R 19/03*  (2006.01)
(52) U.S. Cl. .................................................. 293/120
(58) Field of Classification Search .......... 293/102, 293/120, 121, 132, 135, 136
See application file for complete search history.

(56) References Cited

U.S. PATENT DOCUMENTS

| 3,926,463 | A  | 12/1975 | Landwehr et al. |
| 2002/0121787 | A1 | 9/2002 | Tarahomi et al. |
| 2004/0001945 | A1 | 1/2004 | Cate et al. |

FOREIGN PATENT DOCUMENTS

| DE | 101 07 287 A1 | 9/2002 |
| EP | 1 234 728 B1 | 8/2002 |

*Primary Examiner* — H Gutman
(74) *Attorney, Agent, or Firm* — Antonelli, Terry, Stout & Kraus, LLP.

(57) ABSTRACT

The invention relates to a rear crash element for the rear bumper of a motor vehicle in the area of the number plate recess, having an impact element seated on the crossbeam of the motor vehicle, behind which, with respect to the driving direction of the motor vehicle, a shock absorbing element is arranged. The shock absorbing element is arranged behind the bumper cladding and is covered by a plastic covering, such as a horn cladding or the like. Because the impact element is a plastic part with a large surface area which fills out approximately the entire height of the number plate recess and borders the bumper cladding, preferably over a gap, and the shock absorbing element is seated from the outside on the front side of the bumper cladding flush to the impact element, a breakthrough for the impact element on the bumper cladding is not a consideration, and the impact surface of the impact element to the crossbeam and to the bumper cladding is enlarged such that the energy applied to the bumper is better absorbed.

20 Claims, 9 Drawing Sheets

PRIOR ART

PRIOR ART

PRIOR ART

PRIOR ART

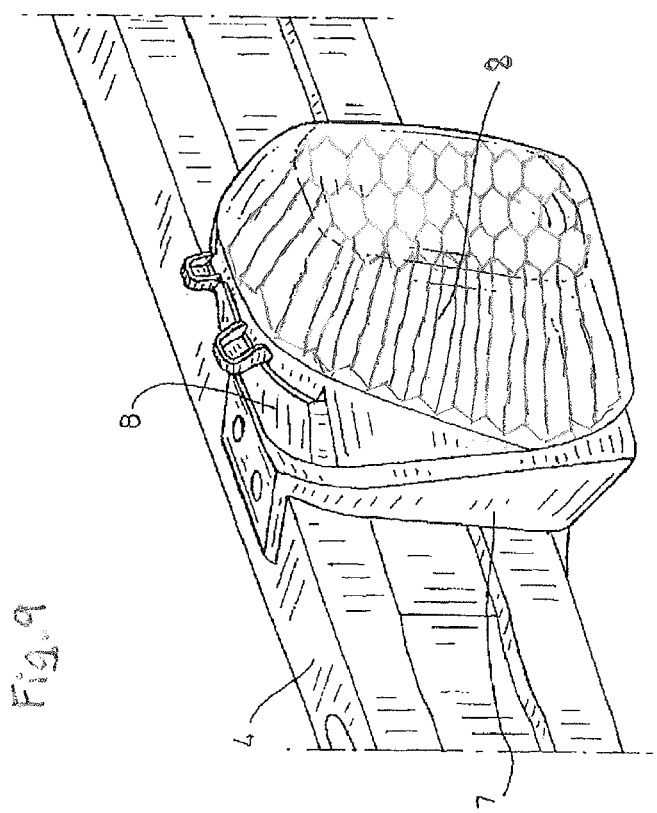

CRASH ELEMENT

BACKGROUND OF THE INVENTION

The invention relates to a rear crash element for the rear bumper of a motor vehicle in the region of the number-plate recess, having an impact element which is set onto the crossbeam of the motor vehicle, and behind which, viewed in the direction of travel of the motor vehicle, a shock-absorbing element is arranged, wherein the element is arranged behind the bumper cladding and is covered with a plastics covering, such as a horn cladding or the like.

In the American and Canadian markets special demands are made on crash management in the rear region.

In order to meet these demands, in particular of the pendulum test, and to avoid penetration of the pendulum, it is known from DE 101 07 287 A1 that the rear bumper cladding can be equipped with a rear crash element in the region of the number-plate recess. This consists of an aluminium profiled section that is set onto the crossbeam and onto which in turn on the bumper side a PUR-RIM horn pad (polyurethane integral foam) is set. In the case of this system an opening is provided/milled in the bumper cladding through which the aluminium profiled section is guided. Fitted above the horn pad projecting out of the bumper cladding there is a plastics covering in the manner of a horn cladding (see FIGS. 1 to 4 and associated description).

The previous system satisfies the demands that exist according to law in the case of the pendulum test. With the effect of force that is offset in a direction of elevation, however, the aluminium profiled section has a tendency to deflect towards it and deform. Moreover, high production costs are to be taken into account for the horn pad of PUR-RIM set thereon. Likewise, additional costs for the introduction of the breakthrough in the bumper cladding are incurred.

BRIEF SUMMARY OF THE INVENTION

The underlying objective of the invention is to develop a rear crash element according to the preamble of claim 1 in such a way that a breakthrough for the impact element on the bumper cladding is not required, the impact area of the impact element with respect to the crossbeam and the bumper cladding is enlarged so that the energy that is introduced is absorbed in a better way, and the impact element can be configured more freely in order to be able to support the shock-absorbing element behind the cladding in the best possible way.

Moreover, the rear crash element is to be tolerance-free with regard to the shock-absorbing element.

This objective is achieved in accordance with the invention in that the impact element is a plastics portion which over a large surface area, almost filling out the whole height of the number-plate recess, borders on the inside of the bumper cladding, preferably by way of a gap, and the shock-absorbing element is set from outside onto the front side of the bumper cladding, in alignment with the impact element.

As a result, the impact area of the impact element with respect to the crossbeam and the bumper cladding is enlarged so that the energy that is introduced is absorbed in a better way. As a result of forming the impact element as a plastics portion, the latter can be configured more freely and therefore support the shock-absorbing element behind the cladding in the best possible way. Since the shock-absorbing element is arranged only between the bumper cladding and the horn cladding and is no longer fixedly mounted on the vehicle, it is not necessary to allow for any clearances for mounting in the X-direction (tolerances) between the horn cladding and the shock-absorbing element. Likewise, improved stability of the cladding is obtained as a result of omitting the cut.

The shock-absorbing element in an advantageous development contains an at least single-layer foam core. This foam core is expediently an EPP foam (expanded polypropylene).

In further development of the invention, the foam core is reinforced with a reinforcing portion in front of the foam core, resting against the bumper cladding.

The reinforcing portion is a plastics plate in a special development. The reinforcing portion can be any portion which has a higher level of solidity than the foam core. The foam core can also be constructed in a plurality of layers, in which case the layer that faces the bumper cladding should have a higher level of solidity or rigidity.

In order to improve the stability, the impact element and the shock-absorbing element can be provided with honeycomb structures in the direction of strike.

On account of the weight of the shock-absorbing element, the latter is preferably secured to the bumper cladding. Any possible means of securement can be chosen here.

In one embodiment, the shock-absorbing element fills out the cavity between the horn cladding and the bumper cladding by way of matching ribs.

In a development of the invention, the area of the impact element that rests against the bumper cladding is reinforced with a reinforcing plate which is secured to the impact element. As a result, better absorption values can be attained.

The reinforcing plate is preferably a metal plate, in particular an aluminium plate.

BRIEF DESCRIPTION OF THE DRAWINGS

FIG. 9 shows a view of the rear crash element provided with a shock-absorbing element with a honeycomb structure in the direction of strike.

The invention is explained in greater detail in the following with the aid of figures.

DETAILED DESCRIPTION OF THE INVENTION

FIGS. 1 through 4 show the prior art.

Figure 1:
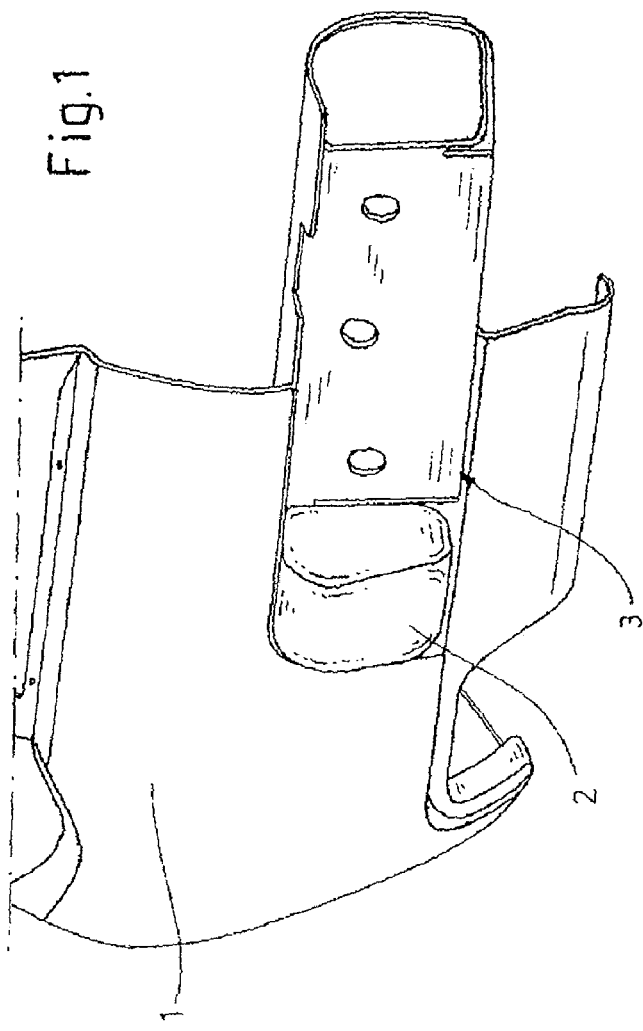
FIG. 1 shows a prior art rear-side bumper cladding 1 of a motor vehicle with a number-plate recess 3 and a rear-crash element.

FIG. 1 shows a rear-side bumper cladding 1 of a motor vehicle with a number-plate recess 3 and a rear-crash element of which, however, only the outer horn cladding 2 can be seen.

Figure 2:
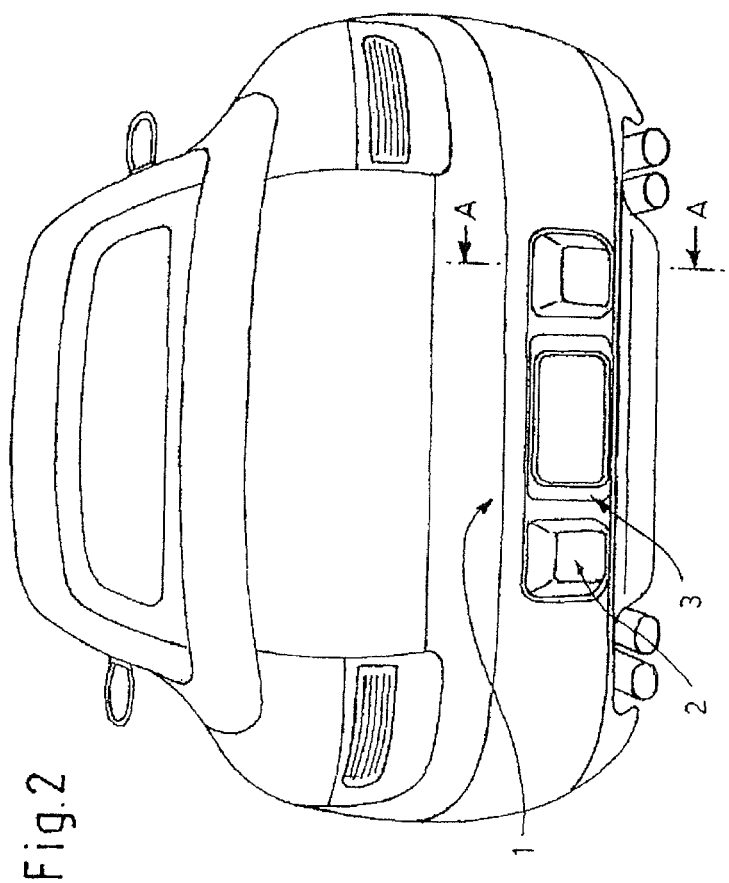
FIG. 2 shows a motor vehicle to which the prior art bumper cladding 1 is secured.

FIG. 2 shows a motor vehicle to which the bumper cladding 1 is secured. The number-plate recess 3 and the horn cladding 2 can be identified easily.

Figure 3:
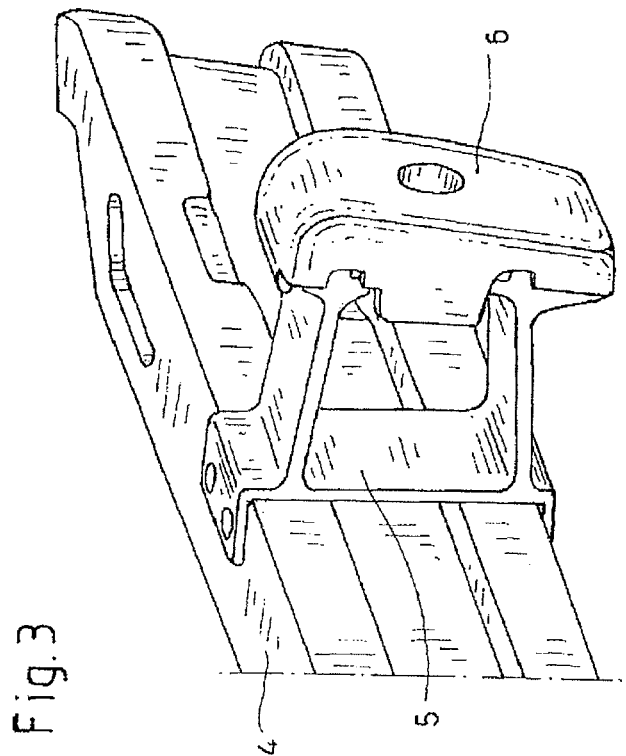
FIG. 3 shows a view of the prior art rear crash element according to FIGS. 1 and 2.

FIG. 3 shows a view of the rear crash element according to FIGS. 1 and 2. This element consists of an aluminium profiled section 5 which is set onto the crossbeam 4 and onto which in turn on the bumper side a PUR-RIM horn pad 6 is set. In the case of this system an opening is provided/milled in the bumper cladding 1 through which the aluminium profiled section 5 is guided. Fitted above the horn pad 6 projecting out of the bumper cladding 1 there is a plastics covering in the form of a horn cladding 2 or the like (see FIGS. 1 and 2). The plastics covering can also be developed as a one-piece bumper cladding that is matched to the horn pad 6 lying underneath or be formed by a number-plate screen.

Figure 4:
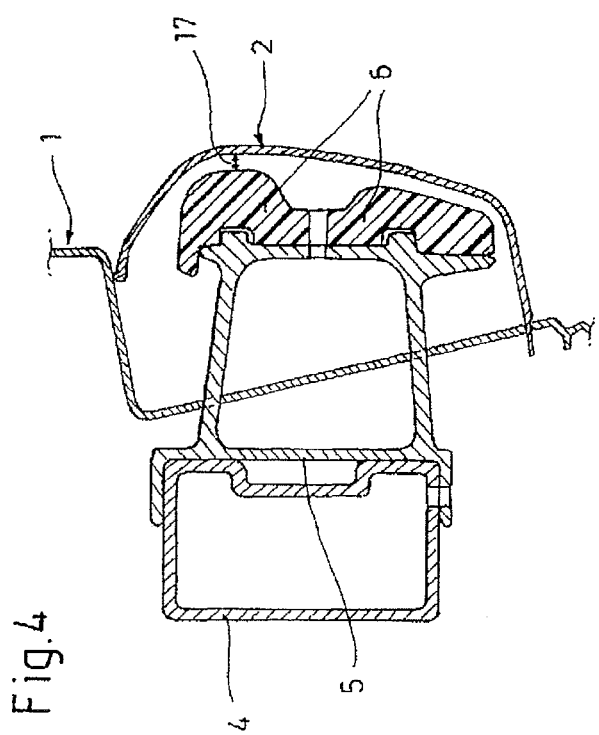
FIG. 4 shows a section along the line A-A of FIG. 2.

FIG. 4 shows a section along the line A-A of FIG. 2. The same reference numerals also indicate the same parts. It can be identified easily that the aluminium profiled section 5 is passed through an opening in the bumper cladding and bears the horn pad 6. The horn pad 6 is arranged with a small mounting clearance 17 from the horn cladding. The horn cladding is secured to the bumper cladding.

Figure 5:
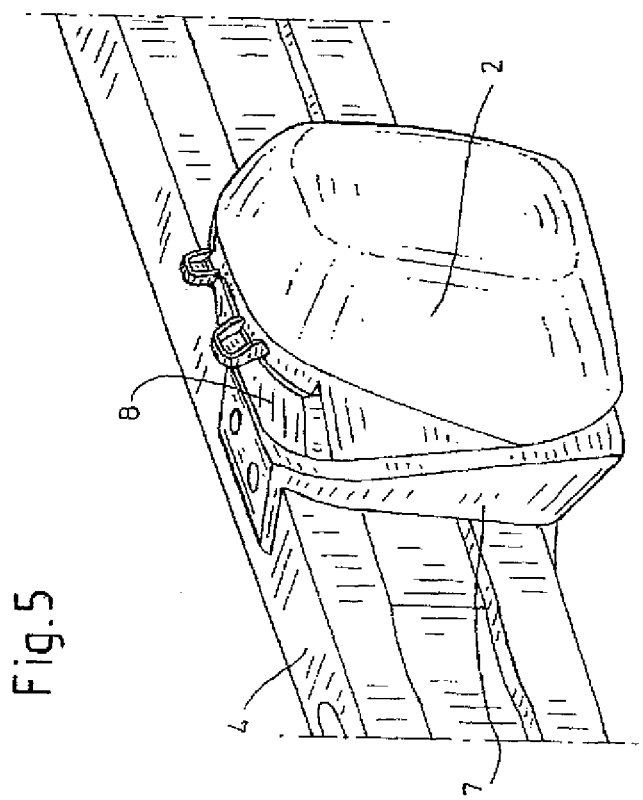
FIG. 5 shows a view of the rear crash element in accordance with the invention.

The rear crash element in accordance with the invention is shown in FIGS. 5 to 9, with FIG. 5 showing a view of the rear crash element, and with FIGS. 6, 7, 8, and 9 showing different embodiments.

In the case of the new concept, the aluminium profiled section 5, including the horn pad 6, that is set onto the crossbeam 4 (see prior art) is replaced by an impact element 7 made from plastics material with a large surface area, also called an impact plate in the following, and a one- or two- or multi-piece shock-absorbing element 8 in the horn cladding 2, with the shock-absorbing element 8 being set from outside onto the front side 11 of the bumper cladding 1, in alignment with the impact element 7. The breakthrough for the aluminium profiled section 5 disappears. The shock-absorbing element 8 is a foam core in the embodiment shown.

This presents many and diverse advantages: the impact area 9 of the impact element 7 with respect to the crossbeam is enlarged so that the energy that is introduced is absorbed in a better way.

Owing to the fact that the impact element 7 is realized in plastics material, the latter can be configured more freely and therefore support the foam core behind the bumper cladding 1 in the best possible way.

Since the foam core is now only introduced between the bumper cladding 1 and the horn cladding 2 and is no longer fixedly mounted on the vehicle, it is not necessary to allow for any clearances 17 for mounting in the X-direction 18 (tolerances), as in the case of the existing concept in accordance with the prior art (see FIG. 4). Likewise, improved stability of the cladding is obtained as a result of omitting the cut.

In order to attain better absorption values (see FIG. 7), additional reinforcement can be effected at the impact element 7 by adding a reinforcing plate 12, in this case an aluminium plate. This reinforcing plate 12 is set onto the impact area 9 of the impact element 7 and preferably secured.

Further reinforcement can be attained by means of the use of a multi-piece shock-absorbing element 8. The portion 8b of the element 8 that faces the impact element 7 in this case consists of a material with a higher level of solidity or strength than the portion 8a of the element 8 arranged behind it. The portion 8b is preferably a plastics plate and the portion 8a is preferably a foam core.

In order to guarantee the greatest possible stability of the components, the impact element 7 and the portion 8b are provided with a honeycomb structure in the direction of strike (an example of which is shown in FIG. 9). Support/securement of the element 8 is to be provided, as a consequence of the increased weight of the multi-piece element 8.

Figure 6:
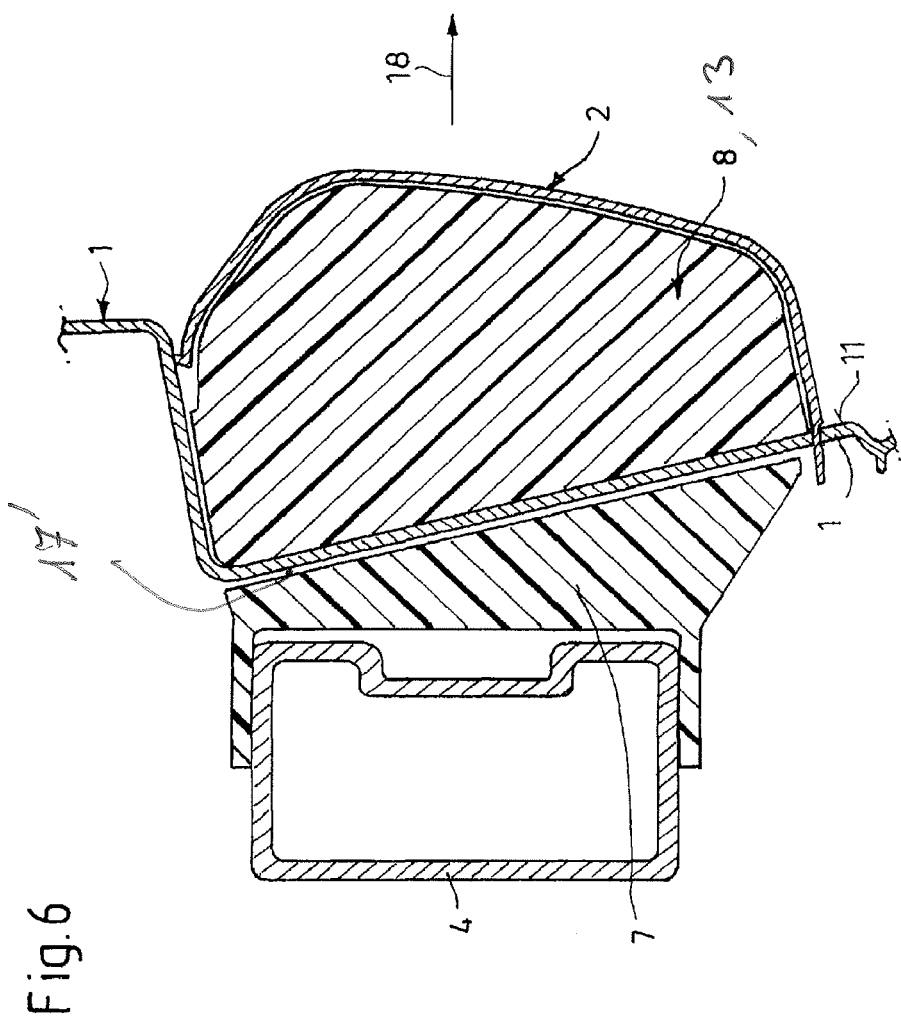
FIG. 6 shows a view of the rear crash element in accordance with an embodiment of the invention.
Figure 7:
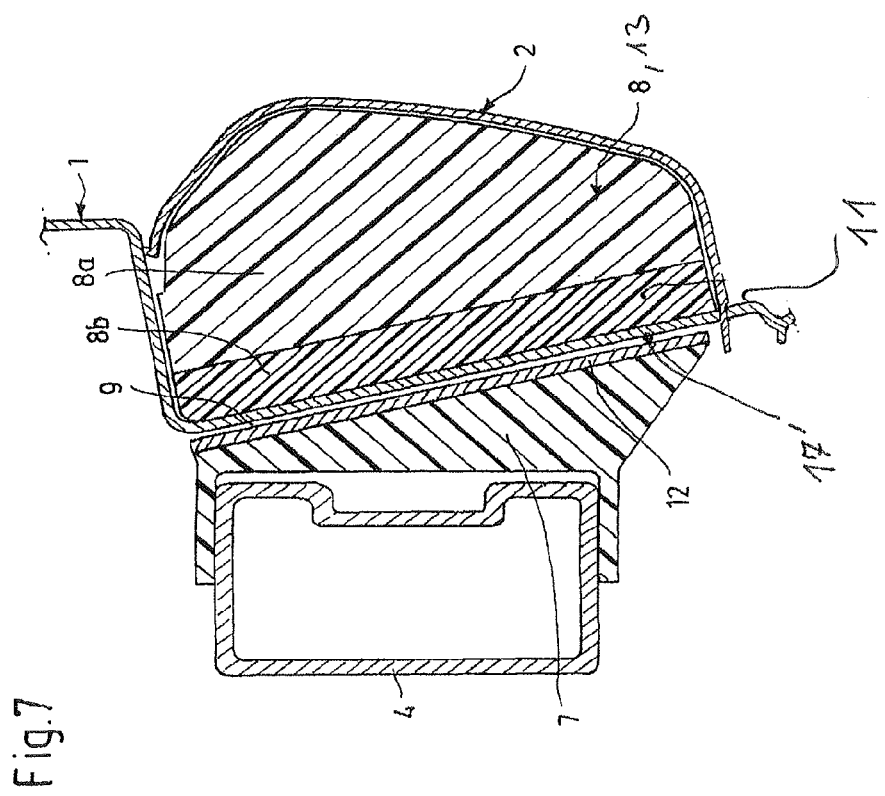
FIG. 7 shows a view of the rear crash element in accordance with another embodiment of the invention.
Figure 8:
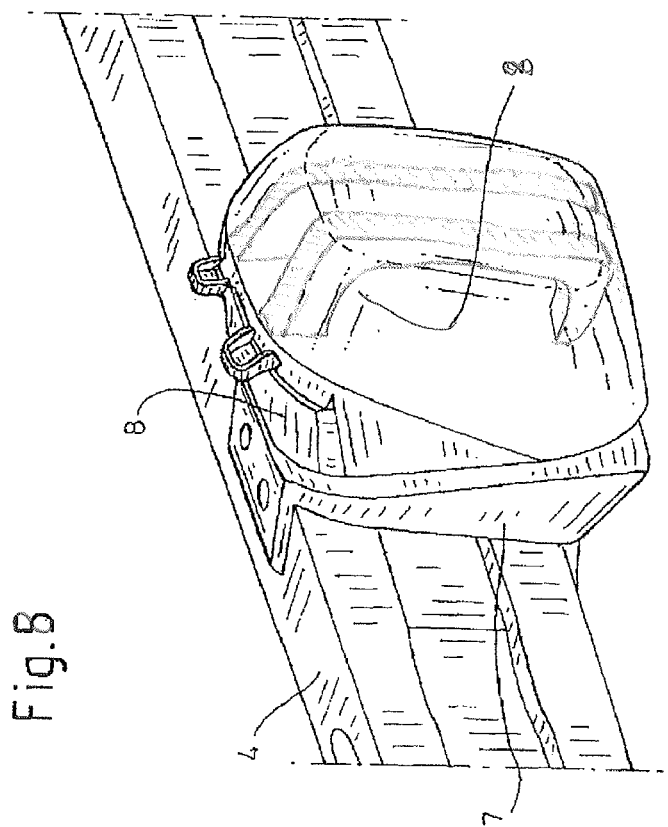
FIG. 8 shows a view of the rear crash element with a shock-absorbing element filling out the cavity between the horn cladding and the bumper cladding by way of matching ribs.

The shock-absorbing element 8 or the foam core respectively is configured in such a way that it fills out the cavity between the horn cladding 2 and the bumper cladding 1 at the rear by way of matching sibs (an example of which is shown in FIG. 8). In the case of the embodiment in accordance with FIG. 7, the cavity is filled out by the shortened foam core and the plastics plate, As shown in FIGS. 6 and 7, arranged between the inside of the bumper cladding 1 and the impact element 7 or the reinforcing plate respectively there is an upright gap 17".

The invention claimed is:

1. A crash element disposed on a bumper of a motor vehicle, in a region of a number-plate recess, comprising:
    an impact element, set onto an outside surface of a crossbeam of the motor vehicle
    a bumper cladding disposed on a surface of the impact element; and
    a shock-absorbing element disposed on a surface of the bumper cladding, in alignment with the impact element such that the bumper cladding interposes between the shock-absorbing element and the impact element, the shock-absorbing element being covered with a plastic covering so as to be continuously enclosed by a combination of the bumper cladding and the plastic covering;
    wherein the height of the impact element is limited by a height of the region of the number-plate recess.

2. A crash element according to claim 1, wherein the shock-absorbing element contains an expanded polypropylene (EPP) foam core with at least a single layer.

3. A crash element according to claim 2, wherein the EPP foam core is reinforced, with a reinforcing portion disposed on a surface of the foam core and resting against the bumper cladding.

4. A crash element according to claim 3, wherein the reinforcing portion includes a plastic plate.

5. A crash element according to claim 1, wherein the plastic covering is continuous and unpunctured.

6. A crash element according to claim 1, wherein the impact element and the shock-absorbing element are both provided with honeycomb structures in the direction of strike.

7. A crash element according to claim 1, wherein the impact element is secured to the bumper cladding.

8. A crash element according to claim 1, wherein the impact element fills out a cavity between the plastic covering and the bumper cladding, by way of matching ribs.

9. A crash element according to claim 1, wherein the area of the impact element that rests against the bumper cladding is reinforced with a reinforcing plate secured to the impact element.

10. A crash element according to claim 9, wherein the reinforcing plate includes a metal plate.

11. A crash element according to claim 10, wherein the metal plate includes an aluminium plate.

12. A crash element according to claim 1, wherein the impact element borders on a surface of the bumper cladding, separated by a gap.

13. A crash element according to claim 1,
    wherein the crash element is disposed on a rear bumper of a motor vehicle.

14. A crash element disposed on a bumper of a motor vehicle, in a region of a number-plate recess, comprising:
    a bumper cladding disposed on the impact element;
    an impact element configured to be set onto a crossbeam of the motor vehicle, and to border on a surface of the bumper cladding, wherein the height of the impact element is limited by a height of the region of the number-plate recess;

a shock-absorbing element, set onto a surface of the bumper cladding, covered with a plastic covering so as to be continuously enclosed by a combination of the bumper cladding and the plastic covering, and disposed in alignment with the impact element such that the bumper cladding interposes between the shock-absorbing element and the impact element.

15. A crash element according to claim 14, wherein the shock-absorbing element contains a foam core with at least a single layer.

16. A crash element according to claim 14, wherein the impact element and the shock-absorbing element are both provided with honeycomb structures in the direction of strike.

17. A crash element according to claim 14, wherein the impact element is secured to the bumper cladding.

18. A crash element according to claim 14, wherein the impact element fills out a cavity between the plastic covering and the bumper cladding, by way of matching ribs.

19. A crash element according to claim 14, wherein the area of the impact element that rests against the bumper cladding is reinforced with a reinforcing plate secured to the impact element.

20. A crash element according to claim 14,
wherein the crash element is disposed on a rear bumper of a motor vehicle.

* * * * *